United States Patent
Oiki et al.

(10) Patent No.: US 10,040,474 B2
(45) Date of Patent: Aug. 7, 2018

(54) STEERING CONTROL DEVICE FOR VEHICLE AND STEERING CONTROL METHOD FOR VEHICLE

(71) Applicant: NISSAN MOTOR CO., LTD., Yokohama-shi, Kanagawa (JP)

(72) Inventors: Daisuke Oiki, Atsugi (JP); Masahiko Kikuchi, Atsugi (JP); Akira Morimoto, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/032,072

(22) PCT Filed: Sep. 24, 2014

(86) PCT No.: PCT/JP2014/075284
§ 371 (c)(1),
(2) Date: Apr. 26, 2016

(87) PCT Pub. No.: WO2015/064249
PCT Pub. Date: May 7, 2015

(65) Prior Publication Data
US 2016/0264172 A1 Sep. 15, 2016

(30) Foreign Application Priority Data

Oct. 31, 2013 (JP) ................. 2013-226182

(51) Int. Cl.
*B62D 6/04* (2006.01)
*B60W 10/04* (2006.01)
(Continued)

(52) U.S. Cl.
CPC ........... *B62D 5/0463* (2013.01); *B62D 6/002* (2013.01); *B62D 6/006* (2013.01); *B62D 6/02* (2013.01)

(58) Field of Classification Search
CPC ...... B62D 5/0463; B62D 5/0493; B62D 6/04; B62D 15/0285; B60W 10/04
See application file for complete search history.

(56) References Cited

U.S. PATENT DOCUMENTS 4,753,308 A * 6/1988 Noto .................... B62D 5/0463
180/446
2007/0118262 A1 5/2007 Nishizaki et al.
(Continued)

FOREIGN PATENT DOCUMENTS

EP 1 867 555 A1 12/2007
JP H06-239258 A 8/1994
(Continued)

OTHER PUBLICATIONS

Search Report dated Oct. 14, 2016 for European Patent Application No. 14857314.0.
(Continued)

*Primary Examiner* — Yuri Kan
(74) *Attorney, Agent, or Firm* — Drinker Biddle & Reath LLP

(57) ABSTRACT

A steering control device (30) for a vehicle, the steering control device controlling a steering device, the steering device having a steering mechanism (10) configured to steer wheels (15) and a driving device (40) configured to provide the steering mechanism (10) with Steering force for the wheels (15), the steering control device configured to; detect turning of the wheels (15); determine whether the vehicle is in a stationary steering state; and increase, when the vehicle is determined to be in a stationary steering state as a result of determination whether the vehicle is in a stationary steering state, the steering force to be provided to the steering mechanism (10) than a value upon determination that the vehicle is not in a stationary steering state, wherein the steering control device (30) is further configured to (Continued)

decrease the steering force to be provided to the steering mechanism (10) than before when the turning of the wheels (15) is detected as a result of providing the steering force with the steering mechanism (10) when the vehicle has been determined to be in a stationary steering state.

7 Claims, 4 Drawing Sheets

(51) Int. Cl.
    *B62D 5/04*    (2006.01)
    *B62D 6/02*    (2006.01)
    *B62D 6/00*    (2006.01)

(56) References Cited

U.S. PATENT DOCUMENTS

| | | | |
|---|---|---|---|
| 2007/0288143 A1 | 12/2007 | Arima et al. | |
| 2011/0098886 A1* | 4/2011 | Deng | B60W 10/04 701/41 |
| 2013/0066523 A1* | 3/2013 | Iwamoto | B62D 5/0493 701/41 |
| 2013/0144492 A1* | 6/2013 | Takano | B62D 15/0285 701/42 |
| 2013/0158806 A1 | 6/2013 | Sugiyama et al. | |
| 2014/0238769 A1* | 8/2014 | Tamaizumi | B62D 6/04 180/446 |

FOREIGN PATENT DOCUMENTS

| | | |
|---|---|---|
| JP | 2001-106106 A | 4/2001 |
| JP | 2005-104403 A | 4/2005 |
| JP | 2007-015529 A | 1/2007 |
| JP | 2007-331481 A | 12/2007 |
| JP | 2008-189119 A | 8/2008 |
| JP | 2013-123984 A | 6/2013 |

OTHER PUBLICATIONS

International Preliminary Report on Patentability (IPRP) dated Apr. 1, 2015 that issued in WO Patent Application No. PCT/JP2014/075284.

International Search Report dated Dec. 22, 2014 for PCT/JP2014/075284.

\* cited by examiner ard 13b. Both ends of the
STEERING CONTROL DEVICE FOR VEHICLE AND STEERING CONTROL METHOD FOR VEHICLE

TECHNICAL FIELD

The present invention relates to a steering control device for a vehicle and a steering control method for a vehicle.

This application claims a priority on the basis of Japanese Patent Application No. 2013-226182, filed on Oct. 31, 2013. The contents of the above application are incorporated herein by reference in the designated countries in which the incorporation by reference is accepted.

BACKGROUND ART

As a prior art, there is known a steering control device for a vehicle, which controls steering of wheels. In such a steering control device for a vehicle, there is also known a technique to increase steering force to be provided to a steering mechanism, when the vehicle is in a stationary steering state in which the steering is performed while the vehicle is at a standstill, compared with when the vehicle is not in the stationary steering state (see Patent Document 1, for example).

PRIOR ART DOCUMENT

Patent Document

[Patent Document 1] JP 6-239258 A

SUMMARY OF INVENTION

Problems to be Solved by Invention

In the prior art, however, when the vehicle is in the stationary steering state and the steering mechanism is accordingly provided with an increased steering force, if the vehicle transitions from the stationary steering state to a non-stationary steering state, the increased steering force provided to the steering mechanism will unduly increase a speed of turning the wheels, which may give an uncomfortable feeling to the driver.

Problems to be solved by the present invention include providing a steering control device for a vehicle which can appropriately execute the steering control of wheels.

Means for Solving Problems

In the present invention, the above problems are solved by decreasing steering force to be provided to a steering mechanism when the turning of wheels is detected as a result of providing the steering force with the steering mechanism when the vehicle has been determined to be in the stationary steering state.

Effect of Invention

According to the present invention, when the turning of wheels is detected, the steering force to be provided to the steering mechanism is suppressed. Therefore, when the vehicle transitions from the stationary steering state to a non-stationary steering state, increase in the turning speed of wheels can be suppressed. This can mitigate an uncomfortable feeling given to the driver due to the turning speed of wheels.

MODE(S) FOR CARRYING OUT THE INVENTION

Hereinafter, embodiments of the present invention will be described with reference to the drawings. In the following description, the present invention will be described by exemplifying a steering control device which is equipped in a vehicle and which can automatically control the steering operation thereby to guide the vehicle to a target position without the driver's steering operation.

Figure 1:
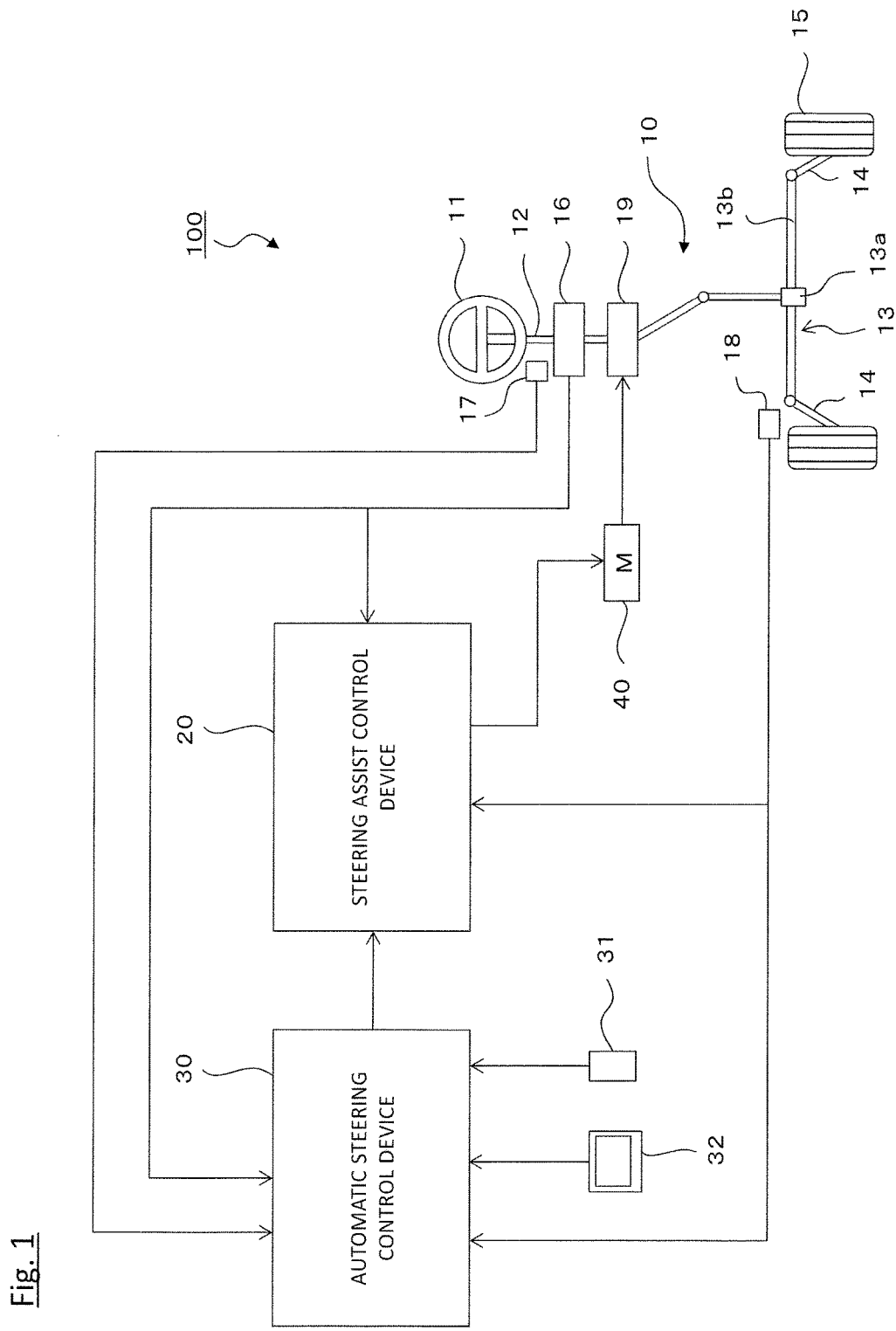
FIG. 1 is a schematic diagram illustrating a steering control device according to an embodiment of the present invention.

FIG. 1 is a schematic diagram which illustrates a steering control device 100 according to the present embodiment. As illustrated in FIG. 1, the steering control device 100 comprises a steering device 10, a steering assist control device 20, an automatic steering control device 30, an automatic steering control switch 31, a display 32, and an electric motor 40.

The steering device 10 has an electric power steering function and steers wheels (e.g. right and left front wheels) 15 in accordance with the steering angle of a steering wheel 11 when the steering wheel 11 is operated by a driver.

Specifically in the steering device 10, a steering system between the steering wheel 11 and the wheels 15 is mechanically connected. The steering system is mainly constituted of a steering shaft 12, a rack gear and pinion gear mechanism 13, and tie rods 14. The steering wheel 11 is attached to the upper end of the steering shaft 12. The rack gear and pinion gear mechanism 13 is connected with the lower end of the steering shaft 12. In addition, a pinion gear 13a is attached to the lower end of a pinion shaft which is connected to the steering shaft 12. The pinion gear 13a meshes with a rack gear 13b which is provided to extend in the vehicle width direction. When a rotating operation for the steering wheel (steering shaft 12) is performed, the rack gear and pinion gear mechanism 13 converts the rotational motion of the steering wheel 11 (steering shaft 12) into linear motion (translational motion) of the rack gear 13b. Both ends of the rack gear 13b are connected to respective knuckle arms (not shown) which are provided at the wheels 15 via the tie rods 14. The linear motion (translational motion) of the rack gear 13b thus allows steering of the wheels 15.

A torque sensor 16 is provided to detect a steering torque which corresponds to a steering input force to the steering device 10. The steering torque detected by the torque sensor 16 is output to the steering assist control device 20 and the automatic steering control device 30.

A steering angle sensor 17 is provided on or near the steering shaft 12 to detect a rotation angle of the steering shaft 12 as a steering angle. The steering angle detected by the steering angle sensor 17 corresponds to a turning angle of the wheels 15. The steering angle (turning angle of the wheels 15) detected by the steering angle sensor 17 is output to the steering assist control device 20 and the automatic steering control device 30.

A vehicle speed sensor 18 is provided to detect a rotating state of the wheels 15. The vehicle speed sensor 18 thereby outputs vehicle speed pulses in accordance with the rotating state of the wheels 15. For example, the vehicle speed sensor 18 detects the rotation of a gear attached to the center of a wheel by using a magnetic sensor (not shown) and can output the vehicle speed pulses. The vehicle speed pulses are output, as speed information of the vehicle, from the vehicle speed sensor 18 to the steering assist control device 20 and the automatic steering control device 30.

The electric motor 40 converts the electric power supplied from an onboard battery (not shown) into a torque. The value of a current to be supplied to the electric motor 40 is determined by the steering assist control device 20 or the automatic steering control device 30. The onboard battery supplies the electric power to the electric motor 40 at the current value determined by the steering assist control device 20 or the automatic steering control device 30.

The electric motor 40 is supplied with the electric power from the onboard battery. The electric motor 40 generates a torque in accordance with the value of a current supplied from the onboard battery and transmits the generated torque to a decelerator 19. The torque transmitted to the decelerator 19 is converted into a rotating torque for the steering shaft 12. This allows the steering device 10 to be supplied with steering power in accordance with the current value.

The steering assist control device 20 is a device for assisting the steering operation by the driver via the steering device 10. The steering assist control device 20 comprises a microcomputer which is mainly constituted of a CPU, a ROM, a RAM, and an I/O interface. The steering assist control device 20 controls driving of the electric motor 40 in accordance with a control program stored in the ROM. The steering assist control device 20 thereby performs steering assist control to assist the steering force of the driver.

Specifically, the steering assist control device 20 has steering assist characteristics in which the relationship among a steering torque, a vehicle speed and a current command value is predetermined. The steering assist control device 20 calculates a current command value, which is a target value of a current to be supplied to the electric motor 40 on the basis of steering assist characteristics.

After calculating the current command value, the steering assist control device 20 controls the onboard battery (not shown) to supply the electric motor 40 with electric power corresponding to the calculated current command value. In the above described manner, the steering assist control device 20 calculates the target value of a current to be supplied to the electric motor 40 as the current command value, on the basis of the steering torque and the vehicle speed. The onboard battery thereby supplies the electric power to the electric motor 40 at the current of the current command value calculated by the steering assist control device 20. Thus, the steering assist control device 20 can allow the steering device 10 to be supplied with the steering power for assisting the steering operation of the driver.

In the present embodiment, the steering assist characteristics may be preliminarily stored in the ROM of the steering assist control device 20 in a form of a control map or an arithmetic expression. The steering assist characteristics are configured such that, as the steering torque is lager, the absolute value of the current command value is lager, and as the vehicle speed is higher, the absolute value of the current command value is smaller.

Next, the automatic steering control device 30 will be described. The automatic steering control device 30 comprises a microcomputer which is constituted of a CPU, a ROM, a RAM, and an I/O interface. The automatic steering control device 30 controls driving of the electric motor 40 in accordance with a control program stored in the ROM. The automatic steering control device 30 thereby executes automatic steering control to automatically perform the steering operation of the steering device 10.

Specifically, when the driver turns on the automatic steering control switch 31, an image captured by a camera is displayed on the screen of a display 32 which is disposed on the instrument panel. In this situation, the driver can set a target parking position by referring to the image displayed on the screen of the display 32 and operating a touch panel provided with the display 32. After the target parking position is set by the driver, the automatic steering control device 30 calculates the positional relationship between the present position of the vehicle and the target parking position. The automatic steering control device 30 further calculates a target traveling route required for the vehicle to travel to the target parking position. The automatic steering control device 30 also calculates a target steering angle at each position on the target traveling route on the basis of the target traveling route and the present position of the vehicle. The automatic steering control device 30 further calculates the value of a current required for the electric motor 40 to be supplied to achieve that target steering angle, as the current command value. The current command value calculated by the automatic steering control device 30 is then output to the steering assist control device 20. A method of calculating the current command value will be described later.

When the automatic steering control switch 31 is turned on, the automatic steering control device 30 outputs a start signal for the automatic steering control to the steering assist control device 20. This changes the steering assist control mode of the steering assist control device 20 to an automatic steering control mode. The electric motor 40 is supplied with the electric power at a current of the current command value output from the automatic steering control device 30, under the control by the steering assist control device 20. Consequently, the electric power at the current command value calculated by the automatic steering control device 30 is converted into a steering torque in the electric motor 40. The steering torque is transmitted as steering force to the steering device 10.

Next, a method of calculating the current command value by the automatic steering control device 30 will be described. In the present embodiment, the automatic steering control device 30 stores a control transfer function in a ROM. Parameters of the control transfer function are, for example, the present steering angle of the vehicle (turning angle of the wheels 15), target steering angle, steering torque, current command value, and the like. The automatic steering control device 30 can calculate the current command value by inputting the present steering angle of the vehicle (turning angle of the wheels 15), target steering angle, steering torque, and the like to the control transfer function stored in the ROM.

In the present embodiment, the automatic steering control device 30 calculates the current command value by using different control transfer functions between in a non-stationary steering state in which the steering is performed while the vehicle is moving and in a stationary steering state in which the steering is performed while the vehicle is at a standstill. Specifically, the automatic steering control device 30 preliminarily stores in the ROM a first control transfer function that is a control transfer function for non-stationary steering and a second control transfer function that is a control transfer function for stationary steering. The automatic steering control device 30 determines whether the vehicle is in the stationary steering state or in the non-stationary steering state, for example, on the basis of the speed information and steering angle of the vehicle. When the vehicle is determined to be in the non-stationary steering state, the automatic steering control device 30 uses the first control transfer function for non-stationary steering to calculate the current command value. When the vehicle is determined to be in the stationary steering state, the automatic steering control device 30 uses the second control transfer function for stationary steering to calculate the current command value.

Figure 2:
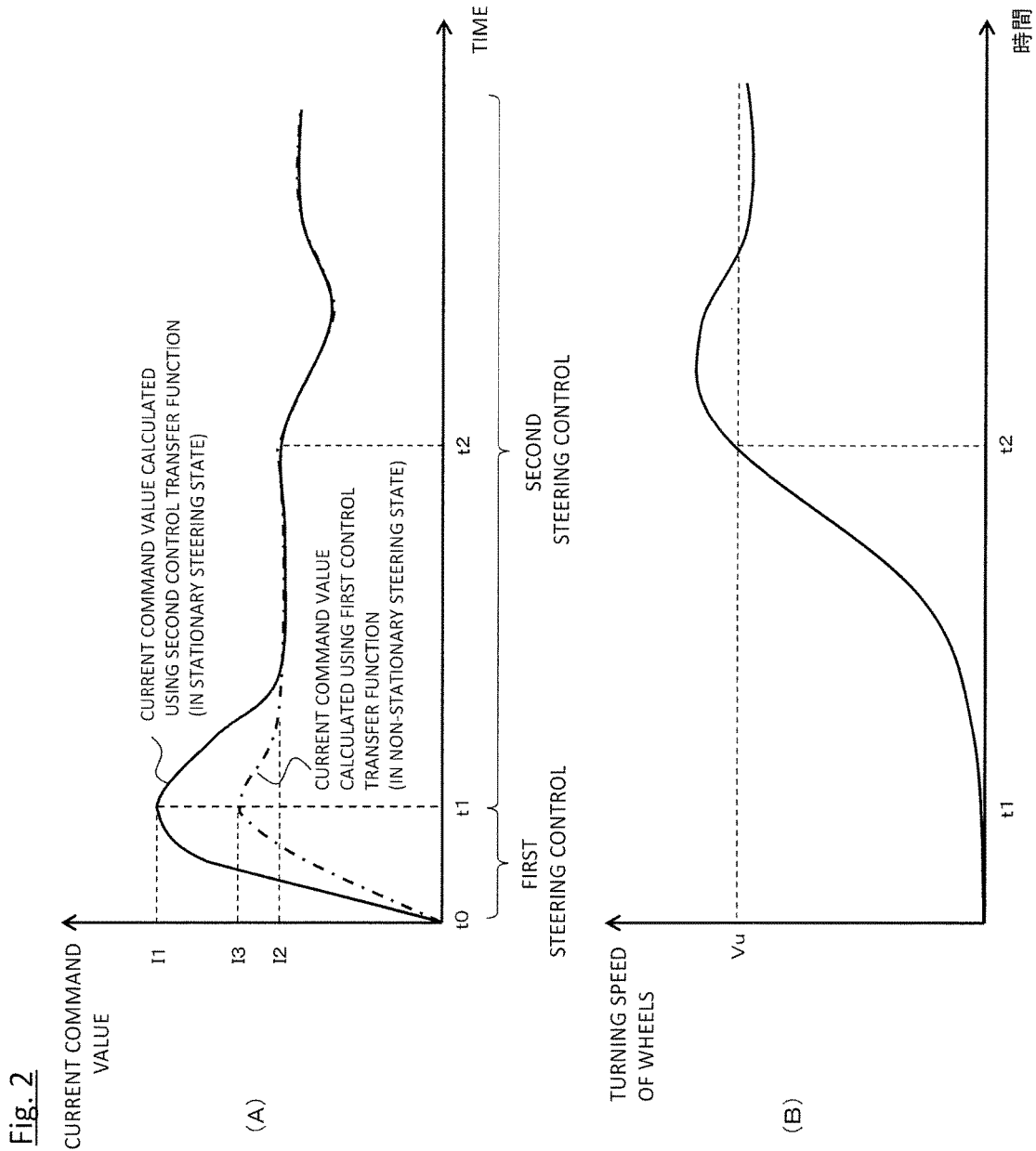
FIG. 2(A) is a graph illustrating an example of a current command value calculated by using a first control transfer function at the time of non-stationary steering and an example of a current command value calculated by using a second control transfer function at the time of stationary steering.
FIG. 2(B) is a graph illustrating an example of a turning speed of wheels at the time of stationary steering of the scenes illustrated in FIG. 2(A).

FIG. 2(A) is a graph illustrating an example of the current command value calculated by using the first control transfer function when the vehicle is in the non-stationary steering state and an example of the current command value calculated by using the second control transfer function when the vehicle is in the stationary steering state. FIG. 2(B) is a graph illustrating an example of a turning speed of the wheels 15 (angular velocity of turning angle) when the vehicle is in the stationary steering state in the scenes illustrated in FIG. 2(A).

When the vehicle is in the stationary steering state, as illustrated in FIG. 2(A), the automatic steering control device 30 gradually increases the current command value on the basis of the second control transfer function so that the current command value comes to a first target current value I1 (details will be described later), from a time t0 at which the automatic steering control is started to a time t1 at which turning of the wheels 15 (change in turning angle of the wheels 15) is detected. In a similar manner, when the vehicle is in the non-stationary steering state, the automatic steering control device 30 gradually increases the current command value on the basis of the first control transfer function so that the current command value comes to a third target current value I3 (details will be described later), from a time t0 at which the automatic steering control is started to a time t1 at which turning of the wheels 15 is detected. The following description will refer to a first steering control that is control from when the automatic steering control is started to when turning of the wheels 15 is detected.

As illustrated in FIG. 2(A), in the first steering control which continues until the turning of the wheels 15 is detected, the automatic steering control device 30 sets the first target current value I1 of the second control transfer function at a higher value than the third target current value I3 of the first control transfer function. According to this setting, a current command value calculated by using the second control transfer function when the vehicle is in the stationary steering state is to be output as a larger value than the current command value calculated by using the first control transfer function when the vehicle is in the non-stationary steering state. As a result, when the vehicle is in the stationary steering state, the electric motor 40 is supplied with a current of a larger value than that when the vehicle is not in the stationary steering state. Therefore, the steering force for the wheels 15 provided to the steering device 10 can be increased during the stationary steering state in which the frictional force between the wheels 15 and the road surface is larger than that when the vehicle is in the non-stationary steering state. This allows the turning angle of the wheels 15 to vary at a desired rate, as illustrated in FIG. 2(B), even in the stationary steering state in which the frictional force between the wheels 15 and the road surface is large, as in the case in which the vehicle is in the non-stationary steering state.

As illustrated in FIG. 2(A), after the turning of the wheels 15 (change in turning angle of the wheels 15) is detected, the automatic steering control device 30 sets the target current command value of the second control transfer function to be the same value as a second target current value I2 that is a target current command value of the first control transfer function. The following description will refer to a second steering control that is control after the turning of the wheels 15 (change in turning angle of the wheels 15) is detected.

According to this setting, as illustrated in FIG. 2(A), when the vehicle is in the stationary steering state, the automatic steering control device 30 gradually decreases the current command value on the basis of the second control transfer function so that the current command value comes to the second target current value I2, from the time t1 at which the turning of the wheels 15 (change in turning angle of the wheels 15) is detected. In a similar manner, when the vehicle is in the non-stationary steering state, the automatic steering control device 30 gradually decreases the current command value on the basis of the first control transfer function so that the current command value comes to the second target current value I2, from the time t1 at which the turning of the wheels 15 (change in turning angle of the wheels 15) is detected. The value of the second target current value I2 is not particularly limited provided that the value of the second target current value I2 is smaller than the first target current value I1 and the third target current value I3. For example, the value of the second target current value I2 is determined to be a value that can achieve the target steering angle on the basis of the steering torque, present steering angle of the vehicle (turning angle of the wheels 15), target steering angle, and the like.

Thus, in the second steering control after the turning of the wheels 15 (change in turning angle of the wheels 15) is detected, the target current command value of the second control transfer function is set at the same value as the second target current value I2 which is the target current command value of the first control transfer function. According to this setting, after the vehicle transitions from the stationary steering state to the non-stationary steering state, the current command value calculated by using the second control transfer function can be the current command value calculated by using the first control transfer function. This can result in suppression of the turning speed of the wheels 15 compared with the case in which the target current command value of the second control transfer function remains at a larger value than the second target current value I2 after the vehicle transitions from the stationary steering state to the non-stationary steering state. It is therefore possible to mitigate an uncomfortable feeling given to the driver due to the turning speed of the wheels 15.

As the above, when the vehicle is in the stationary steering state, as illustrated in FIG. 2(A), the automatic steering control device 30 gradually increases the current command value on the basis of the second control transfer function so that the current command value comes to the first target current value I1, from the time t0 at which the automatic steering control is started. The electric motor 40 is supplied with electric power from the onboard battery at a current in accordance with the current command value, and provides the steering force to the steering device 10 in accordance with the current command value. As a result, as illustrated in FIG. 2(B), the steering force of the steering device 10 becomes larger than the frictional force between the wheels 15 and the road surface, and the turning of the wheels 15 is started. After the turning of the wheels 15 is started, the automatic steering control device 30 sets the second target current value I2 as the target current command value of the second control transfer function. According to this setting, as illustrated in FIG. 2(A), the automatic steering control device 30 gradually decreases the current command value on the basis of the second control transfer function so that the current command value comes to the second target current value I2. This can result in suppression of increase in the turning speed of the wheels 15 after the turning of the wheels 15 is detected, and it is thus possible to mitigate an uncomfortable feeling given to the driver due to the turning speed of the wheels 15.

Moreover, in the present embodiment, the automatic steering control device 30 repeatedly determines whether the turning speed of the wheels 15 is not less than a predetermined speed Vu on the basis of the steering angle (turning angle of the wheels 15) acquired from the steering angle sensor 17. When the turning speed of the wheels 15 becomes not less than the predetermined speed Vu, for example, at a time t2 as illustrated in FIG. 2(B), the automatic steering control device 30 resets the current command value to zero or decreases the current command value thereby to suppress the turning speed of the wheels 15 so that the turning speed of the wheels 15 becomes not more than the predetermined speed Vu. By suppressing the turning speed of the wheels 15 in such a manner, it is possible to mitigate an uncomfortable feeling given to the driver due to the turning speed of the wheels 15, for example, when the driver intervenes into the steering operation.

Furthermore, in the present embodiment, after starting the first steering control, the automatic steering control device 30 calculates a change rate of the turning angle of the wheels 15 at the current command value. Further, the automatic steering control device 30 estimates a friction coefficient $\mu$ between the wheels 15 and the road surface on the basis of the calculated change rate. The automatic steering control device 30 then changes the first target current value I1 of the second control transfer function on the basis of the estimated friction coefficient $\mu$.

Figure 3:
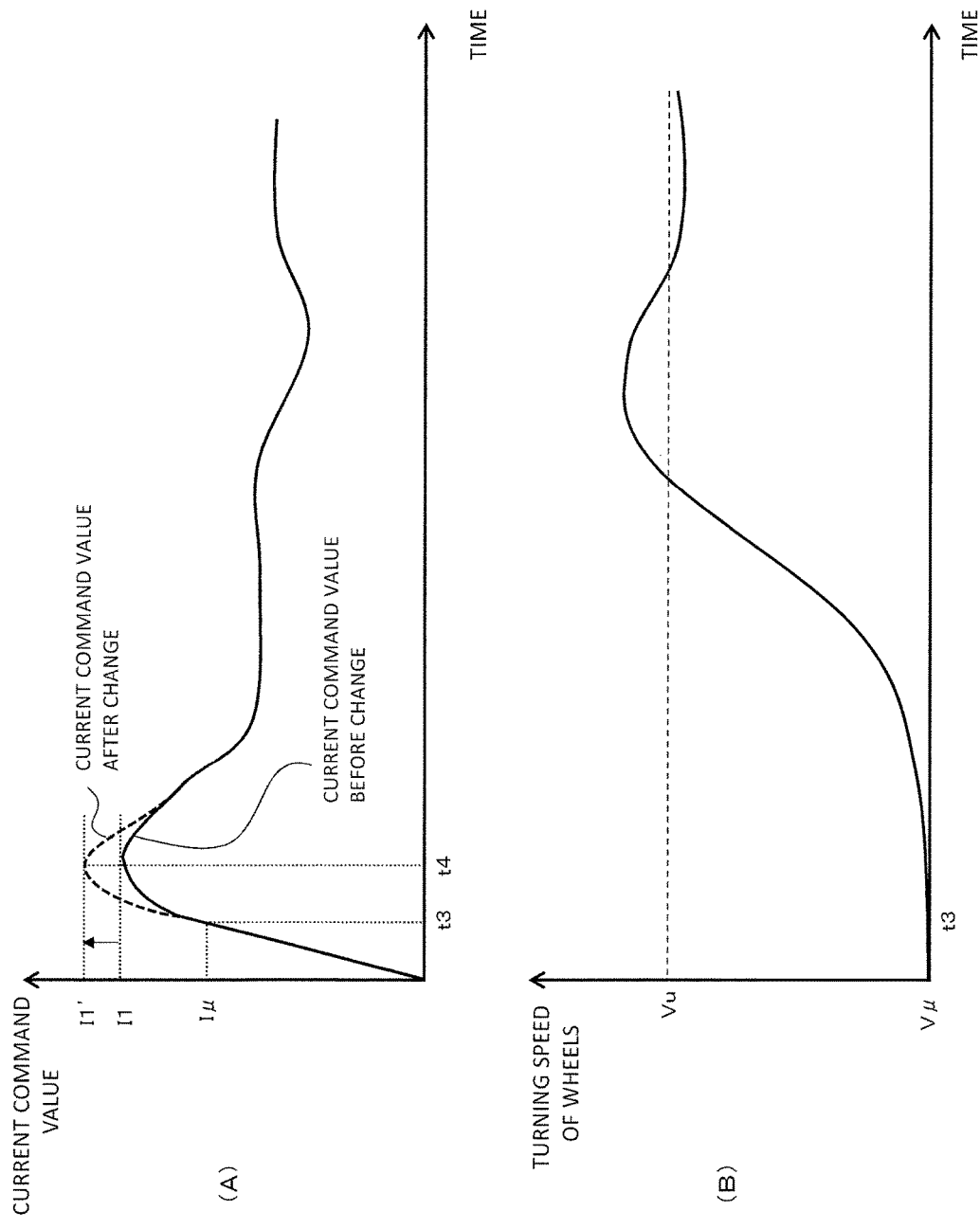
FIG. 3 is a graph for explaining a method of setting a target current command value on the basis of a friction coefficient t.

FIG. 3(A) is a graph illustrating an example of the current command value calculated by using the second control transfer function in the scene illustrated in FIG. 2(A), and FIG. 3(B) is a graph illustrating an example of the turning speed of the wheels 15 in the scene illustrated in FIG. 2(B). As illustrated in FIGS. 3(A) and 3(B), the automatic steering control device 30 calculates the change rate of the turning angle of the wheels 15 at a current command value I$\mu$ on the basis of the current command value I$\mu$ and a turning speed V$\mu$ of the wheels 15 which are obtained at a time t3 when a certain period of time has passed from starting the automatic steering control (in an early stage of the automatic steering control). The automatic steering control device 30 estimates the friction coefficient $\mu$ between the wheels 15 and the road surface so that the friction coefficient $\mu$ becomes larger as the calculated change rate becomes smaller.

The automatic steering control device 30 then changes the first target current value I1 of the second control transfer function such that the first target current value I1 of the second control transfer function is larger as the estimated friction coefficient is larger. For example, in the example illustrated in FIG. 3(A), the estimated friction coefficient $\mu$ is large, and therefore the automatic steering control device 30 changes the first target current value I1 of the second control transfer function to I1' larger than I1 in accordance with the estimated friction coefficient $\mu$. According to this operation, the automatic steering control device 30 increases the current command value so that the current command value comes to the changed first target current value I1' in the first steering control until the turning of the wheels 15 is detected. As a result, the electric motor 40 is supplied with electric power at a current in accordance with the friction coefficient $\mu$ between the wheels 15 and the road surface. Then the steering device 10 is provided with steering force in accordance with the friction coefficient $\mu$ between the wheels 15 and the road surface. Therefore, the automatic steering control can be appropriately performed regardless of the friction coefficient $\mu$ between the wheels 15 and the road surface.

Although not illustrated, also when the vehicle is in the non-stationary steering state and the current command value is calculated by using the first control transfer function, the automatic steering control device 30 may calculate, in a similar manner to the above, the change rate of the turning angle of the wheels 15 at the current command value in the early stage of the automatic steering control. The automatic steering control device 30 then may estimate the friction coefficient $\mu$ between the wheels 15 and the road surface on the basis of the calculated change rate and changes the third target current value I3 of the first control transfer function on the basis of the estimated friction coefficient $\mu$. According to this operation, also when the vehicle is in the non-stationary steering state and the current command value is calculated by using the first control transfer function, the current command value can be appropriately calculated in accordance with the friction coefficient $\mu$ between the wheels 15 and the road surface.

Figure 4:
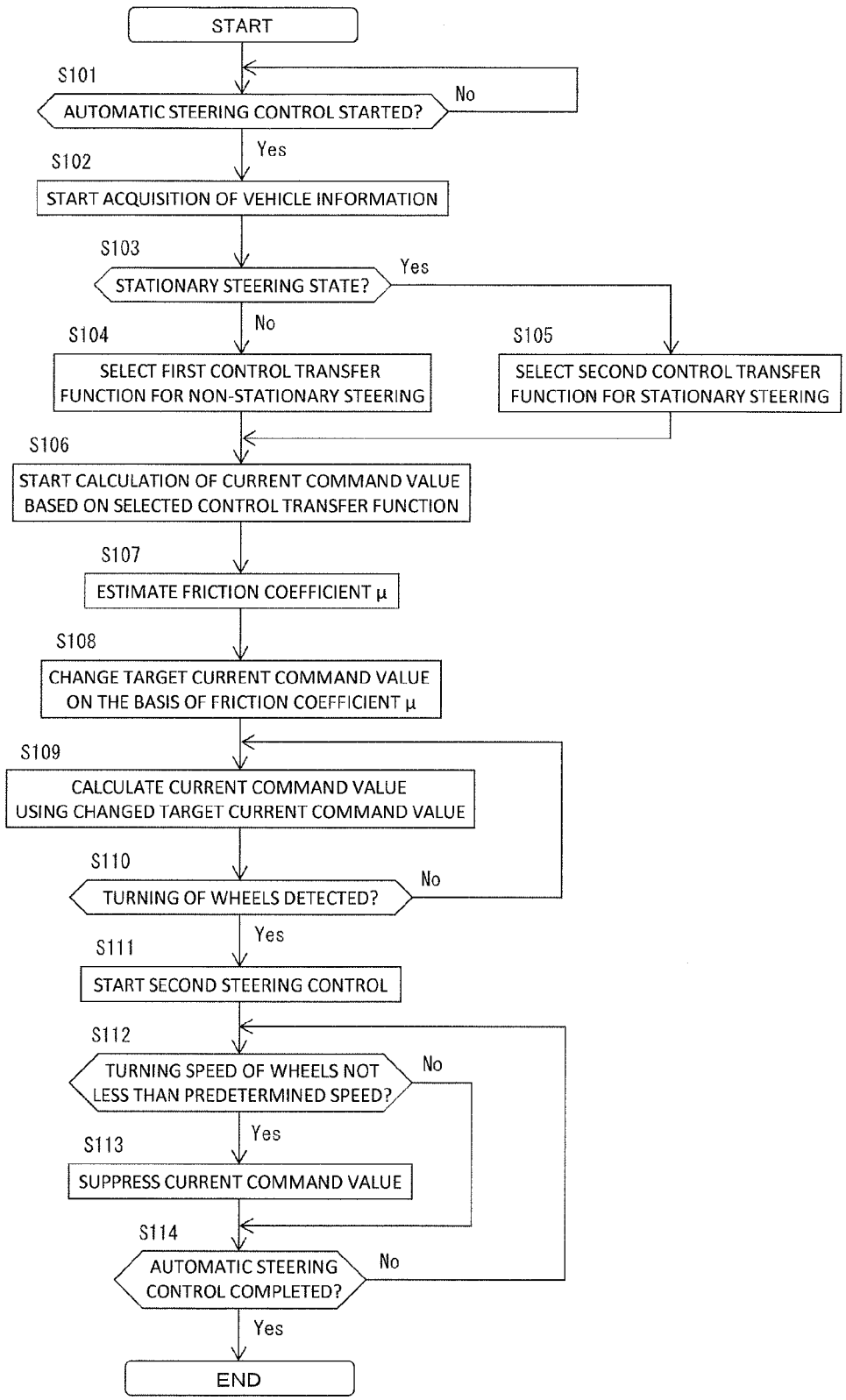
FIG. 4 is a flowchart illustrating a steering control process according to the embodiment.

Next, with reference to FIG. 4, a steering control process or sequence according to the present embodiment will be described. FIG. 4 is a flowchart for explaining the steering control process according to the present embodiment.

First, in step S101, the automatic steering control device 30 determines whether the automatic steering control is started. For example, the automatic steering control device 30 can determine that the automatic steering control is started when the automatic steering control switch 31 is turned on. If the automatic steering control is determined to be started, the process proceeds to step S102, while if the automatic steering control is determined not to be started, the process waits in step S101.

In step S102, the automatic steering control device 30 starts acquisition of the vehicle information of the vehicle. For example, in the present embodiment, the automatic steering control device 30 acquires a steering torque, which is input to the steering device 10, from the torque sensor 16, a steering angle of the steering device 10 (turning angle of the wheels 15) from the steering angle sensor 17, and a vehicle speed from the vehicle speed sensor 18. The automatic steering control device 30 repeatedly acquires the vehicle information at regular intervals not only in step S102 but also in the subsequent steps.

In step S103, the automatic steering control device 30 determines whether the vehicle is in the stationary steering state in which the steering is performed while the vehicle remains at a standstill. For example, the automatic steering control device 30 can determine that the vehicle is in the stationary steering state when the vehicle is at a standstill and a steering torque, which is a predetermined value or more, is input, on the basis of the vehicle speed of the vehicle and the steering torque which are acquired in step S102.

If the vehicle is determined to be in the non-stationary steering state in step S103, the process proceeds to step S104. In step 104, the automatic steering control device 30 selects the first control transfer function for non-stationary steering as the control transfer function for calculating the current command value.

On the other hand, if the vehicle is determined to be in the stationary steering state in step S103, the process proceeds to step S105. In step S105, the automatic steering control device 30 selects the second control transfer function for stationary steering as the control transfer function for calculating the current command value.

Then in steps S106 to S110, the automatic steering control device 30 executes the first steering control as illustrated in FIG. 2(A). Specifically, first in step S106, the automatic steering control device 30 starts calculation of the current command value based on the first control transfer function selected in step S104 or the second control transfer function selected in step S105. That is, if the vehicle is in the stationary steering state, calculation of the current command value based on the second control transfer function is started, while if the vehicle is in the non-stationary steering state, calculation of the current command value based on the first control transfer function is started.

In step S107, the automatic steering control device 30 estimates the friction coefficient μ between the wheels 15 and the road surface. Specifically, the automatic steering control device 30 calculates the change rate of the turning speed at the current command value Iμ on the basis of the current command value Iμ and the turning speed Vμ of the wheels 15 in the early stage of the first steering control, as illustrated in FIGS. 3(A) and 3(B). The automatic steering control device 30 then estimates the friction coefficient μ between the wheels 15 and the road surface on the basis of the calculated change rate.

Then in step S108, the automatic steering control device 30 changes the first target current value I1 of the second control transfer function or the third target current value I3 of the first control transfer function on the basis of the friction coefficient g estimated in step S107. Specifically, the automatic steering control device 30 changes the first target current value I1 or the third target current value I3 to a larger value as the estimated friction coefficient μ is larger, as illustrated in FIG. 3(A).

In step S109, the automatic steering control device 30 starts calculation of the current command value by using the first target current value I1 or the third target current value I3 changed in step S108. Then in step S110, the automatic steering control device 30 determines whether the turning of the wheels 15 is detected. For example, the automatic steering control device 30 repeatedly acquires the steering angle of the steering device 10 (turning angle of the wheels 15), and can determine that the turning of the wheels 15 is detected when the turning angle of the wheels 15 varies. If the turning of the wheels 15 is detected, the process proceeds to step S111. While if the turning of the wheels 15 is not detected, the process returns to step S109 and the calculation of the current command value in the first steering control is repeated.

In step S111, the automatic steering control device 30 starts execution of the second steering control which is control after the turning of the wheels 15 is detected. Specifically, as illustrated in FIG. 2(A), the automatic steering control device 30 changes the first target current value I1 to the second target current value I2 smaller than the first target current value I1 when the current command value is calculated by using the second control transfer function. Similarly, the automatic steering control device 30 changes the third target current value I3 to the second target current value I2 smaller than the third target current value I3 when the current command value is calculated by using the first control transfer function. The automatic steering control device 30 then gradually decreases the current command value on the basis of the first control transfer function or the second control transfer function so that the current command value comes to the second target current value I2.

In step S112, the automatic steering control device 30 determines whether the turning speed of the wheels 15 is not less than the predetermined speed Vu. If the turning speed of the wheels 15 is determined not to be less than the predetermined speed Vu, the process proceeds to step S113. In step 113, the automatic steering control device 30 suppresses the current command value. This can suppress the turning speed of the wheels 15 so that the turning speed is less than the predetermined speed Vu. On the other hand, if the turning speed of the wheels 15 is determined to be less than the predetermined speed Vu, the process proceeds to step S114.

In step S114, the automatic steering control device 30 determines whether the automatic steering control has been completed. For example, the automatic steering control device 30 can determine that the automatic steering control has been completed when the vehicle has traveled to a target parking position, when the driver intervenes into the steering operation while the automatic steering control is being executed, or when the automatic steering control switch 31 is turned off. If the automatic steering control is determined to have not been completed, the process returns to step S112. In step 112, the automatic steering of the wheels 15 is performed by the second steering control. While if the automatic steering control is determined to have been completed, the steering control process shown in FIG. 4 is terminated.

As described above, in the present embodiment, in the first steering control until the turning of the wheels 15 is detected, the current command value is calculated as a larger value and the steering device 10 is provided with larger steering force when the vehicle is in the stationary steering state than steering force when the vehicle is in the non-stationary steering state. It is thereby possible to appropriately turn the wheels 15 even in the stationary steering state in which the frictional force between the wheels 15 and the road surface is larger than that in the non-stationary steering state. Moreover, in the present embodiment, when the vehicle is determined to be in the stationary steering state, the electric motor 40 is supplied with a current of a larger current command value than that in the non-stationary steering state. As the result, the wheels 15 start to turn. After the wheels 15 start to turn (that is, in the second steering control after the turning of the wheels 15 is detected), the current command value of the current supplied to the electric motor 40 is suppressed to reduce the steering force provided to the steering device 10. This can mitigate an uncomfortable feeling given to the driver due to unduly increase of the turning speed of the wheels 15 when the vehicle transitions from the stationary steering state to the non-stationary steering state. More specifically, when the vehicle transitions from the stationary steering state to the non-stationary steering state, if the electric motor 40 is supplied with electric power at a current of the current command value of the stationary steering state even in the non-stationary steering state, the turning speed of the wheels 15 may be unduly increased to give an uncomfortable feeling to the driver, for example, when the driver tries to intervene into the steering operation. In contrast, according to the present embodiment, when the vehicle transitions from the stationary steering state to the non-stationary steering state, the current command value is suppressed to decrease the current to be supplied to the electric motor 40, and the turning speed of the wheels 15 can thereby be suppressed. This can mitigate an uncomfortable feeling given to the driver due to the turning speed of the wheels 15.

Moreover, in the present embodiment, when the current command value is calculated by using the second control transfer function in the second steering control, the target current command value in the second steering control is set at the same value as the second target current value I2 which is set in case of calculating the current command value by using the first control transfer function. According to this setting, even after the turning of the wheels 15 is detected, the turning speed of the wheels 15 can be appropriately suppressed in response to the traveling state of the vehicle as merely by calculating the current command value on the basis of the second control transfer function.

Furthermore, in the present embodiment, the first control transfer function and the second control transfer function are preliminarily stored, and the steering control is performed by using the first control transfer function when the vehicle is in the non-stationary steering state, while the steering control is performed by using the second control transfer function when the vehicle is in the stationary steering state. According to this operation, an appropriate current command value can be relatively easily calculated merely by inputting necessary parameters to the control transfer function which is selected in accordance with whether the vehicle is stationary steering state.

In the present embodiment, the change rate of the turning angle of the wheels 15 at the current command value in the early stage of the automatic steering control is calculated, and a friction coefficient μ between the wheels 15 and the road surface is estimated on the basis of the calculated change rate. Therefore, the current command value can be calculated in accordance with the friction coefficient μ between the wheels 15 and the road surface, as illustrated in FIG. 3(A), by changing the first target current value I1 of the second control transfer function or the third target current value I3 of the first control transfer function on the basis of the friction coefficient μ. The steering device 10 can thus be provided with the steering force in accordance with the friction coefficient μ between the wheels 15 and the road surface. As a result, the automatic steering control can be appropriately performed regardless of the value of the friction coefficient μ between the wheels 15 and the road surface.

In addition, in the present embodiment, it is repeatedly determined whether the turning speed of the wheels 15 is not less than the predetermined speed Vu, and when the turning speed of the wheels 15 becomes not less than the predetermined speed Vu, the current command value is suppressed. This operation can mitigate an uncomfortable feeling given to the driver due to the turning speed of the wheels 15, for example, when the driver intervenes into the steering operation.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, in the above-described embodiments, the present invention has been described by exemplifying a configuration comprising: determining whether the vehicle is in the stationary steering state and calculating the current command value to be supplied to the electric motor 40 by using the determination result in the scene where the automatic steering control device 30 executes the automatic steering control, but the present invention is not limited to this configuration. For example, another embodiment may be configured such as determining whether the vehicle is in the stationary steering state and calculating the current command value to be supplied to the electric motor 40 on the basis of the determination result in the scene where the steering assist control device 20 assists the steering operation by the driver. In this case, as the first steering control, it is possible to control steering force from when the steering torque is input to when the turning of the wheels 15 is detected.

In the above-described embodiments, the present invention has been described by exemplifying a configuration in which the friction coefficient μ between the wheels 15 and the road surface is estimated and the target current command value is changed on the basis of the estimated friction coefficient μ, but the present invention is not limited to this configuration. For example, another embodiment may be configured such that the current command value is corrected on the basis of the estimated friction coefficient μ. In a possible example of such a configuration, when the vehicle is in the stationary steering state, the current command value calculated by using the second control transfer function is corrected on the basis of the estimated friction coefficient μ, and the electric motor 40 is supplied with electric power at a current in accordance with the corrected current command value.

In the above-described embodiments, the steering device 10 corresponds to the steering mechanism of the present invention, the electric motor 40 corresponds to the drive unit of the present invention, and the automatic steering control device 30 corresponds to the detection unit, determination unit and control unit of the present invention.

DESCRIPTION OF REFERENCE NUMERALS

100 . . . Steering control device
10 . . . Steering device
16 . . . Torque sensor
17 . . . Steering angle sensor
18 . . . Vehicle speed sensor
20 . . . Steering assist control device
30 . . . Automatic steering control device
40 . . . Electric motor

What is claimed is:

1. A steering, control device for a vehicle, the steering control device controlling a steering device, the steering device having a steering mechanism configured to steer wheels and a driving device configured to provide the steering mechanism with steering force for the wheels,
the steering control device configured to:
detect steering of the wheels of the vehicle;
determine whether the vehicle is in a stationary steering state;
when the vehicle is determined to be in a stationary steering state increase the steering force to be provided to the steering mechanism to more than the steering force to be provided to the steering mechanism upon a determination that the vehicle is not in a stationary steering state; and when the steering of the wheels of the vehicle is detected as a result of providing the steering force to the steering mechanism when the vehicle has been determined to be in a stationary steering state, decrease the steering force to be provided to the steering mechanism to less than the steering force to be provided to the steering mechanism when the vehicle has been determined to be in a stationary steering state.

2. The steering control device for a vehicle according to claim 1, wherein the steering control device is further configured to be able to execute a first steering control in which the steering force to be provided to the steering mechanism is controlled so that the steering force of the steering mechanism comes to a first target steering force and a second steering control in which the steering force to be provided to the steering mechanism is controlled so that the steering force of the steering mechanism comes to a second target steering force smaller than the first target steering force, and the steering control device executes the first steering control when the vehicle is determined to be in a stationary steering state and executes the second steering control from the time that steering of the wheels is detected as a result of executing the first steering control.

3. The steering control device for a vehicle according to claim 2, wherein the steering control device is further configured to:
calculate a change rate of a steering angle of the wheels at the steering force of the steering mechanism in an early stage of the first steering control;
estimate a friction coefficient between the wheels and a road surface on a basis of the change rate; and
set the steering force to be provided to the steering mechanism on a basis of the estimated friction coefficient.

4. The steering control device for a vehicle according to claim 2, wherein the steering control device is further configured to set a value of the second target steering force to a value of the steering force that is provided to the steering mechanism when the vehicle is determined not to be in a stationary steering state.

5. The steering control device for a vehicle according to claim 1, wherein the steering control device is further configured to decrease the steering force to be provided to the steering mechanism than before when a steering speed of the wheels is a predetermined speed or more as a result of providing the steering force with the steering mechanism.

6. The steering control device for a vehicle according to claim 1, wherein the steering control device is further configured to execute processing by using a first transfer function for calculating the steering force and to execute processing by using a second transfer function, a steering force calculated by using the second transfer function being larger than that calculated by using the first transfer function at least until steering of the wheels is detected, and the steering control device calculates the steering force by using the first transfer function when the vehicle is determined not to be in a stationary steering state and calculates the steering force by using the second transfer function when the vehicle is determined to be in a stationary steering state.

7. A steering control method for a vehicle, the steering control method performing control of a steering, device, the steering device having a steering mechanism configured to steer wheels and a driving device configured to provide the steering mechanism with steering force for the wheels, the steering control method comprising:

determining whether the vehicle is in a stationary steering state;

when the vehicle is determined to be in a stationary steering state, increasing the steering force to be provided to the steering mechanism to more than the steering force to be provided to the steering mechanism upon a determination that the vehicle is not in a stationary steering state; and when steering of the wheels of the vehicle is detected as a result of the providing steering force to the steering mechanism when the vehicle has been determined to be in a stationary steering state, the steering force to be provided to the steering mechanism to less than the steering force to be provided to the steering mechanism when the vehicle has been determined to be in a stationary steering state.

\* \* \* \* \*